United States Patent [19]

Takahashi

[11] Patent Number: 5,538,677
[45] Date of Patent: Jul. 23, 1996

[54] METHOD OF PRODUCING ELASTIC ROLLER WHOSE EXTERNAL CURVED SURFACE CYLINDRICAL SHAPE IS OF VARYING DIAMETER

[75] Inventor: Masaaki Takahashi, Asaka, Japan

[73] Assignee: Canon Kabushiki Kaisha, Tokyo, Japan

[21] Appl. No.: 386,191

[22] Filed: Feb. 9, 1995

Related U.S. Application Data

[62] Division of Ser. No. 888,496, May 27, 1992.

[30] Foreign Application Priority Data

| | | | |
|---|---|---|---|
| May 28, 1991 | [JP] | Japan | 3-150900 |
| Aug. 23, 1991 | [JP] | Japan | 3-235616 |
| May 11, 1992 | [JP] | Japan | 4-117471 |

[51] Int. Cl.⁶ .......................... B29C 33/38; B29C 39/18
[52] U.S. Cl. .................. 264/221; 29/895.32; 264/226; 264/227; 264/317
[58] Field of Search ........................ 264/221, 226, 264/227, 275, 317, 162; 29/895.32, 527.1

[56] References Cited

U.S. PATENT DOCUMENTS

| | | | |
|---|---|---|---|
| 2,842,820 | 7/1958 | Brennan | 264/221 |
| 3,447,221 | 6/1969 | Odiorne | 29/895.32 |
| 3,619,446 | 11/1971 | Nauta | 264/226 |
| 4,050,886 | 9/1977 | Moser | 492/56 |
| 4,250,135 | 2/1981 | Orsini | 264/227 |
| 5,089,201 | 2/1992 | Takahashi | 29/895.32 |

FOREIGN PATENT DOCUMENTS

| | | | |
|---|---|---|---|
| 62-268613 | 11/1987 | Japan | 264/317 |
| 63-218982 | 9/1988 | Japan . | |
| 01174423 | 7/1989 | Japan . | |

*Primary Examiner*—Robert Davis
*Attorney, Agent, or Firm*—Fitzpatrick, Cella, Harper & Scinto

[57] ABSTRACT

An elastic layer is formed stably of constant shape without cutting of surface thereof and without difficult processing to make an internal surface of hollow in a mold into an off-right-circular cylinder shape. A matrix 1 is produced by shaping a periphery of rod material into an inverted crown shape of off-right-circular cylinder. Annular reinforcements 2, 3 are fixed on the both ends of inverted crown portion of matrix 1. The matrix 1 with the reinforcements 2, 3 is dipped in an electrolytic solution 5a, so that a nickel alloy is deposited over a surface of matrix 1 by electroforming to obtain a mold 4. The mold 4 is cut outside the reinforcements 2, 3 and a hollow for dissolution removal is perforated along the axis of matrix 1. The mold 4 is dipped in a corrosive solution which can dissolve only the matrix 1, so that only the matrix 1 is dissolved to remove away from the mold 4. The remaining mold 4 will have a hollow of inverted crown therein. An elastic material is injected into the hollow of inverted crown of mold 4 to form an elastic layer on a periphery of mandrel, thereby obtaining an elastic roller of inverted crown.

7 Claims, 10 Drawing Sheets

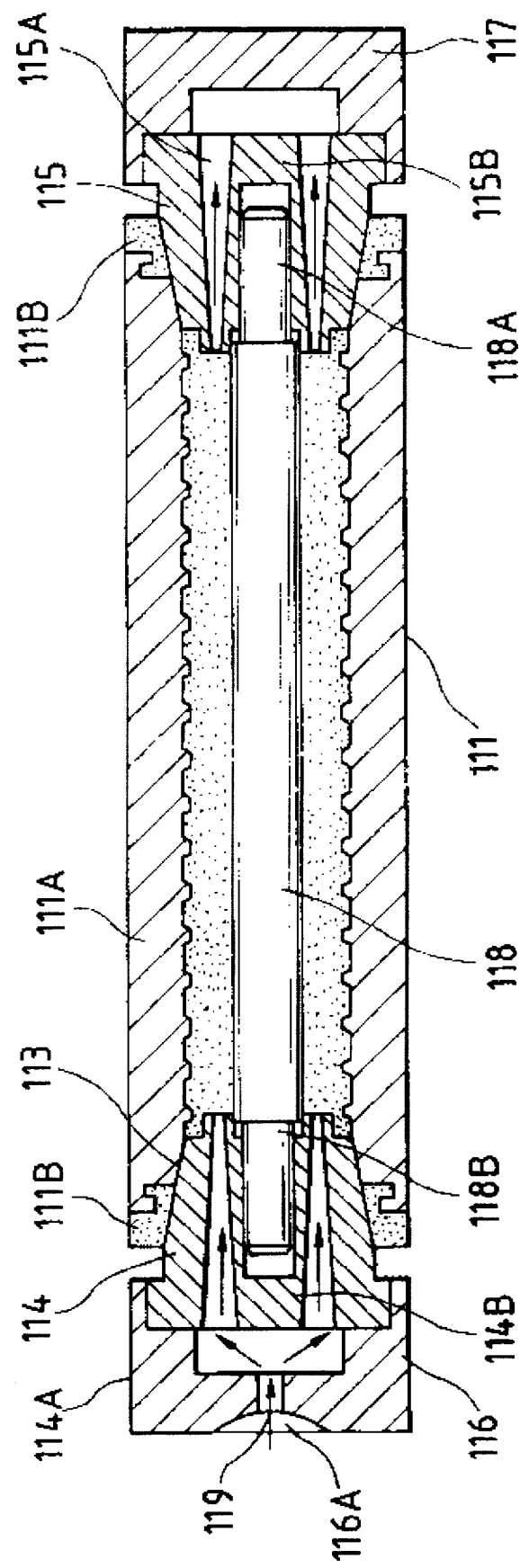

METHOD OF PRODUCING ELASTIC ROLLER WHOSE EXTERNAL CURVED SURFACE CYLINDRICAL SHAPE IS OF VARYING DIAMETER

This application is a division, of application Ser. No. 07/888,496, filed May 27, 1992, now abandoned.

BACKGROUND OF THE INVENTION

1. Field of the Invention

The present invention relates to an elastic roller of off-right-circular cylinder with an elastic body being formed on a periphery of mandrel, which may be used, for example, as a fixing roller or a pressing roller of fixing unit, as a cleaning roller or a charge roller for photosensitive member, as a sheet feed roller of sheet feed unit in a copying machine or in a laser beam printer, and further as a platen roller in a printer or in a facsimile, to a unit using the elastic roller, to a method for producing the elastic roller, and to a molding apparatus of the elastic roller.

2. Related Background Art

In recent copying machines, printers, and facsimile machines which require high precision conveyance of record sheet by elastic rollers or in which an elastic roller must be pressed to contact with another member in a uniform nip width therebetween, the elastic roller is sometimes required to have a shape of off-right-circular cylinder which as used herein is one whose external form (i.e. diameter) varies in the longitudinal direction of elastic roller, such as of crown or of inverted crown to satisfy the requirements of conveyance of record sheet or others. For example, the elastic roller of crown may generally provide a high press contact force with a counter roller, and is often used in case of longer roller to prevent reduction of nip width in the central portion of roller bent as compared to that at the both ends. In contrast, an elastic roller of inverted crown is effective to prevent wrinkles on a record sheet, and is generally used for a relatively shorter roller in which a press contact force with a counter roller is small.

The following is conventional methods for producing such elastic rollers of off-right-circular cylinder.

(1) An elastic material is vulcanization-bonded on a periphery of mandrel of rod to form an elastic layer, and the elastic layer is shaped into a shape of off-right-circular cylinder by grinding to obtain an elastic roller of off-right-circular cylinder.

(2) A through hole is perforated in a mold, for example, by a drill, and an internal surface of the hole is finished into the shape of off-right-circular cylinder by cutting and honing. A mandrel of rod is inserted into the finished hole through the mold and the both ends of mandrel are fixed on the mold through caps. Then an elastic material is filled into a space between the mold and the mandrel to form an elastic layer on a periphery of mandrel (see Japanese Patent Application Laid-open No. 1-174423).

(3) A mandrel of rod is inserted into a hole of right circular cylinder having a constant inner diameter perforated in a mold, and the both ends of mandrel are fixed on the mold through caps. Then an elastic material is filled in a space between the mold and the mandrel, and thereafter vulcanized. Upon the vulcanization, a temperature of the mold is different along the axis of mandrel to differ thermal progress in vulcanization, so that an elastic layer of off-right-circular cylinder may be formed after mold release (Japanese Patent Application Laid-open No. 63-218982).

The following problems are acknowledged on the above described conventional methods (1)–(3) for producing the elastic roller of off-right-circular cylinder.

In the method (1), it is difficult to grind the surface of elastic layer into the off-right-circular cylinder shape to obtain a surface finished in a desired surface roughness.

In the method (2), the grinding finish is unnecessary for the surface of elastic layer as is required in the method (1). It is, however, so difficult to finish the internal surface of longitudinally elongate hole with high precision into the off-right-circular cylinder shape by cutting and honing.

In the method (3), it is unnecessary to finish the hole of mold into the off-right-circular cylinder shape, as is required in the method (2). However, since the vulcanization has a great circumstance dependency, the elastic layer cannot be formed in a constant shape after mold release, and a molding duration is longer for a portion vulcanized at a low temperature.

SUMMARY OF THE INVENTION

It is an object of the present invention to provide an elastic roller of off-right-circular cylinder, a unit using the elastic roller, a method for producing the elastic roller, and a molding apparatus of the elastic roller, without necessity of surface grinding of elastic layer, without difficult machining of internal surface of hole of mold into the off-right-circular cylinder shape, and with an elastic layer of stably constant shape, and further to provide a thermal fixing roller and a method for producing the thermal fixing roller, in which a cylindrical elastic layer is formed on a periphery of shaft-like mandrel and geometric unevenness is provided with a high precision over a surface of the elastic layer.

To achieve the above object, an elastic roller of off-right-circular cylinder according to the present invention has a mandrel and an elastic layer of off-right-circular cylinder formed on a periphery of the mandrel: in which the elastic layer is formed such that a mold is formed by making a material for the mold adhered to a surface of a matrix shaped in said off-right-circular cylinder, and then that an elastic material is injected into a hollow made by dissolving to remove the matrix out of the mold.

The material of mold may be deposited over a surface of matrix by electroforming, and the matrix may be dissolved to remove in a corrosive liquid.

Further, the off-right-circular cylinder may be of inverted crown, and the roller may be used as a sheet feed roller for conveying a transfer member to an image carrying member in a copying machine or in a laser beam printer.

The off-right-circular cylinder may be of crown, the elastic layer may be made of a material with conductivity, and the roller may be used as a charge roller for uniformly charging an image carrying member in a copying machine or in a laser beam printer.

The off-right-circular cylinder may be of crown, and the roller may be used as a cleaning roller for removing non-transferred residual toner remaining on an image carrying member in a copying machine or in a laser beam printer.

The off-right-circular cylinder may be of inverted crown, and the roller may be used as a fixing roller for fixing toner transferred from an image carrying member onto a transfer member, on the transfer member in a copying machine or in a laser beam printer.

The off-right-circular cylinder may be of inverted crown, and the roller may be used as a pressing roller for pressing a transfer member onto a transfer roller in a copying machine or in a laser beam printer.

The off-right-circular cylinder may be of inverted crown, and the roller may be used as a platen roller in a recording apparatus with a recording head effecting recording on a recording medium, the platen roller opposing the recording head with the recording medium being pinched therebetween.

The off-right-circular cylinder may be of crown, and the roller may be used as a platen roller for sensor in a facsimile, the platen roller opposing the sensor for reading an original document with the original document being pinched therebetween.

A unit using an elastic roller of off-right-circular cylinder according to the present invention, which is used as a sheet feed unit in a copying machine or in a laser beam printer, comprises:

an elastic roller of off-right-circular cylinder as used as the above-mentioned sheet feed roller;

a stack member, on which a plurality of transfer members are stacked, for urging an uppermost transfer member stacked thereon, against the elastic roller; and separating means for separating the uppermost transfer member away from the other transfer members stacked on the stack member.

A unit using an elastic roller of off-right-circular cylinder, which is used as a charge unit in a copying machine or in a laser beam printer, comprises:

an elastic roller of off-right-circular cylinder as used as the above-mentioned charge roller, the elastic roller being pressed to contact with an image carrying member in the copying machine or in the laser beam printer; and a power source for applying a voltage to the elastic roller.

A unit using an elastic roller of off-right-circular cylinder, which is used as a cleaning unit in a copying machine or in a laser beam printer, comprises:

an elastic roller of off-right-circular cylinder as used as the above cleaning roller, the elastic roller being pressed to contact with an image carrying member in the copying machine or in the laser beam printer to scrape off residual toner on the image carrying member; and a toner storage section for storing the scraped-off residual toner.

A unit using an elastic roller of off-right-circular cylinder, which is used as a fixing unit in a copying machine or in a laser beam printer, comprises:

an elastic roller of off-right-circular cylinder as used as the above fixing roller.

roller heating means provided inside the elastic roller; and an elastic roller of off-right-circular cylinder as used as the above pressing roller, which is urged against the former elastic roller.

A method for producing an elastic roller of off-right-circular cylinder according to the present invention has a step of producing a mold with a hollow of off-right-circular cylinder identical in shape to a periphery of elastic roller to be produced, and a step of injecting an elastic material into the hollow of the mold to form an elastic layer on a periphery of a mandrel: in which the mold producing step comprises:

a step of producing a matrix shaped in the off-right-circular cylinder;

a step of forming the mold by making a material for the mold adhered over a surface of a portion of off-right-circular cylinder of the matrix; and a step of dissolving to remove the matrix out of the formed mold.

A method for producing an elastic roller of off-right-circular cylinder has a step of producing a mold with a hollow of off-right-circular cylinder identical in shape to a periphery of elastic roller to be produced, a step of inserting a mandrel into said hollow of the mold and then fixing both ends of the mandrel at both ends of the hollow of the mold by respective caps, and a step of injecting an elastic material into the hollow of the mold to form an elastic layer on a periphery of a mandrel: in which the mold producing step comprises:

a step of producing a matrix shaped in the off-right-circular cylinder;

a step of fixing respective annular reinforcements on both ends of periphery of off-right-circular cylinder of the matrix;

a step of forming the mold by making a material for the mold adhered over a surface of a portion of off-right-circular cylinder of the matrix and of the reinforcements; and a step of dissolving to remove the matrix out of the formed mold, excluding the reinforcements.

The adhesion of mold material may be deposition by electroforming, and the dissolution removal of matrix may be effected in a corrosive liquid.

A molding apparatus for an elastic roller of off-right-circular cylinder according to the present invention, comprises:

holding means covering to hold a mold produced by either of methods for producing an elastic roller of off-right-cylinder according to the present invention while being maintained at a constant temperature by heating means;

injecting means for injecting an elastic material into the mold; and evacuating means for evacuating air in the mold.

In the method for producing the elastic roller of off-right-circular cylinder according to the present invention, the mold is formed by making the material of mold adhered onto the surface of off-right-circular cylinder portion of matrix. After dissolving to remove the matrix from the mold, the hollow of off-right-circular cylinder remains in the mold in the shape identical to the contour of matrix.

When the annular reinforcements are closely set on the both sides of off-right-circular cylinder portion of matrix, the reinforcements are secured in integral with the mold on the both sides of off-right-circular cylinder hollow in the mold after dissolution removal of matrix.

Studying to solve the above described problems in the conventional techniques, Inventor found to complete the present invention that if geometrical unevenness is provided with a high precision over a surface of elastic layer formed on a surface of shaft-like mandrel of thermal fixing roller, wrapping of sheet around the thermal fixing roller was to be effectively prevented and no slip occurs between the roller and a sheet because paper powder or toner, which degraded conveyance of sheet, enters recesses of the unevenness on the elastic layer, maintaining excellent sheet conveyance for a long time.

In a method for producing a thermal fixing roller according to the present invention, the elastic layer is formed such that an elastic material is poured into a mold with caps provided on respective ends of cylindrical hollow through the mold for holding the shaft-like mandrel concentrically with the cylindrical hollow, and then hardened. Using the mold given over an internal surface thereof with a counter pattern, which is an inverted copy of the unevenness of geometric pattern formed over the surface of elastic layer, the thermal fixing roller may be produced with the geometric pattern of unevenness with a high precision over the surface of elastic layer.

The mold may be obtained with desired geometric pattern of unevenness in its internal surface as follows. A matrix is produced in the contour identical to a desired thermal fixing roller, a desired geometric pattern of unevenness is formed over a surface of matrix by etching or by electric spark machining, a material of mold is adhered onto a periphery of matrix with the unevenness by addition processing, the thus-adhered mold material is machined into a predetermined shape of mold, and only the matrix is finally removed therefrom.

BRIEF DESCRIPTION OF THE DRAWINGS

FIGS. 1 to 9 concern a first embodiment according to the present invention, in which:

FIG. 1 is a schematic drawing of example of copying machine in which an elastic roller of off-right-circular cylinder according to the present invention is used;

FIG. 2 is a sectional view of matrix shaped in off-right-circular cylinder shape produced by an embodiment of method for producing an elastic roller of off-right-circular cylinder according to the present invention;

FIG. 3 is a sectional view of the matrix as shown in FIG. 2 with reinforcements fixed on the both sides of off-right-circular cylinder portion of the matrix;

FIG. 4 is a drawing to show a process of depositing a material of mold over a surface of off-right-circular cylinder portion of matrix and the reinforcements as shown in FIG. 3;

FIG. 5 is a sectional view of the matrix and the mold as shown in FIG. 4, which is machined into a cylinder with perforation of hollow for dissolution removal;

FIG. 6 is a drawing to show a process of dissolution removal of matrix from the mold as shown in FIG. 5, excluding the reinforcements;

FIG. 7 is a sectional view of the mold with the reinforcements as shown in FIG. 6 after dissolution removal of matrix and machining of internal surface of the reinforcements;

FIG. 8 is a sectional view of assembly of the mold as shown in FIG. 7 with a mandrel, caps, and cap covers;

FIG. 9 is a schematic drawing of an embodiment of molding apparatus of elastic roller according to the present invention;

FIGS. 10–14 concern a second embodiment according to the present invention, in which:

FIG. 10-(1) is a perspective view of thermal fixing roller with geometrical unevenness thereon according to the present invention;

FIG. 10-(2) is an enlarged drawing of geometrical pattern on the surface of the roller as shown in FIG. 10-(1);

FIG. 11 is a sectional view of mold before dissolution of matrix used in the method according to the present invention;

FIG. 12 shows processes for producing the mold used in the method according to the present invention, with sections to show the respective processes;

FIG. 13 shows further processes of production of mold following the processes in FIG. 12, with sections of respective processes; and FIG. 14 is a sectional view to show a process for forming a thermal elastic roller of the present invention with the mold produced in the processes of FIGS. 12 and 13.

DESCRIPTION OF THE PREFERRED EMBODIMENTS

A first embodiment of the present invention will be explained with reference to FIGS. 1–9.

A copying machine is explained with reference to FIG. 1 as an example of apparatus in which elastic rollers of off-right-circular cylinder of the present invention are used.

Figure 1:
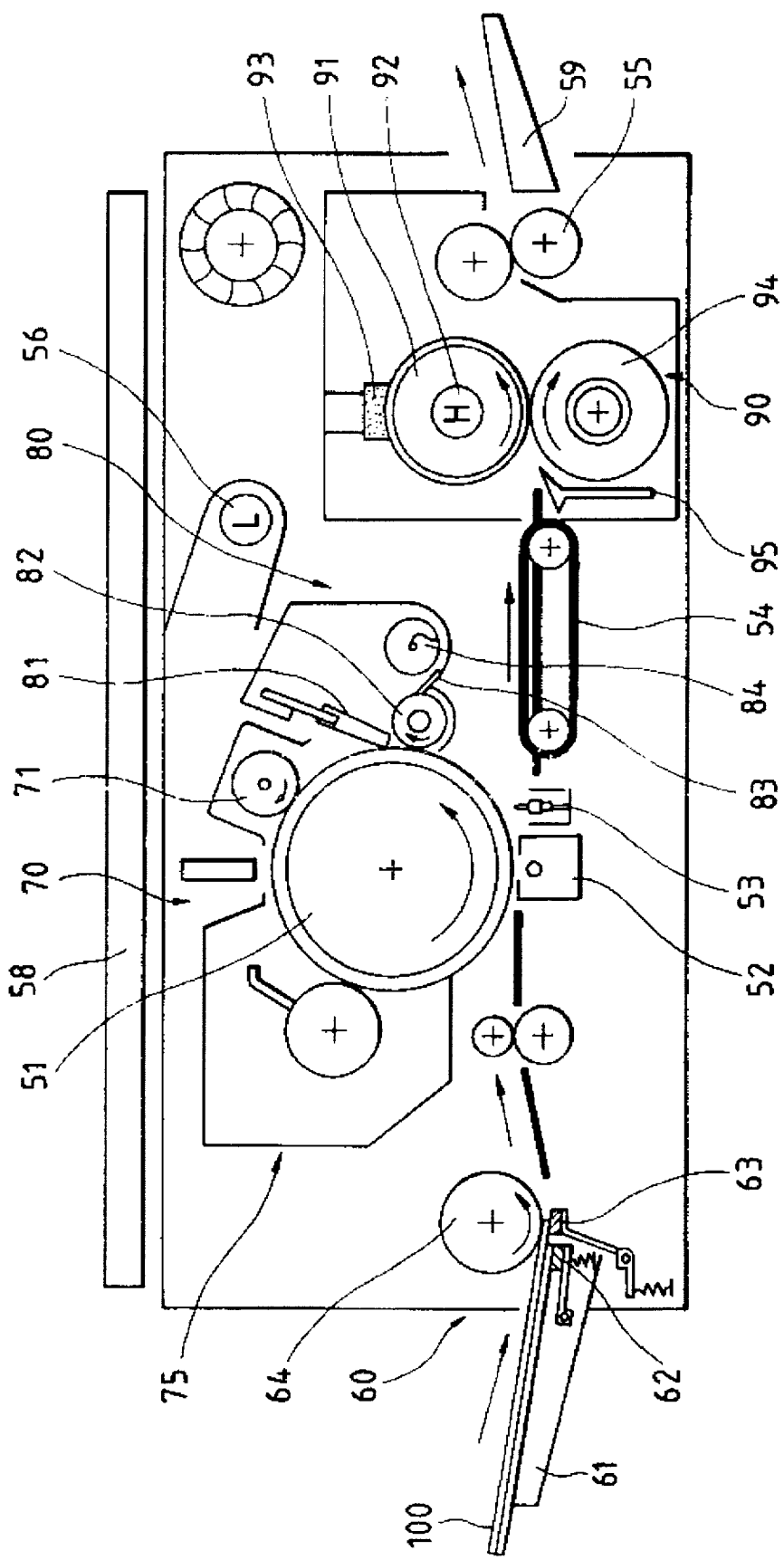

FIG. 1 is a schematic drawing of example of copying machine in which elastic rollers of off-right-circular cylinder of the present invention are used. As shown in FIG. 1, the copying machine is constituted of a transfer section 70 for transferring a toner image onto a transfer member 100, a sheet feed unit 60 for supplying the transfer member 100 to the transfer section 70, a cleaning unit 80 for cleaning a photosensitive member after transfer of toner image onto the transfer member 100, and a fixing unit 90 for fixing the toner image transferred onto the transfer member 100, on the transfer member 100. The sheet feed unit 60 has a sheet feed roller 64 journaled rotatably in the direction of arrow as shown and a sheet feed cassette 61 on which a plurality of transfer members 100 of sheet are stacked. The right end in FIG. 1 of transfer member 100 stacked on the sheet feed cassette 61 is urged against the sheet feed roller 64 by a separation pad 62 biased upwards by a spring. Another separation pad 63 is provided right in FIG. 1 to the separation pad 62, and urged against the sheet feed roller 64 by a spring. An uppermost one of transfer members 100 is separated from the others by the separation pads 62, 63 in cooperation. Thus the transfer members 100 are fed one by one to the transfer section 70. The sheet feed roller 64 conveys the transfer member 100 with a friction to the transfer member 100 while urged against the transfer member 100, so that the sheet feed roller 64 is formed of inverted crown to prevent wrinkles of transfer member 100. An elastic layer of the roller is made of polynorbornene. Hardness of polynorbornene is 40 with Asker (Trademark) C scale based on SRIS (The Society of Rubber Industry Standard, in Japan).

A photosensitive drum 51, which is an image carrying member, is rotatably journaled in the transfer section 70. The photosensitive drum 51 is so opto-semiconducting that when the charged photosensitive drum is subject to optical radiation, the irradiated portion is discharged into zero potential. A conductive charge roller 71 connected to an unrepresented power source is urged against the surface of photosensitive drum 51. The power source and the charge roller 71 constitute a charge unit. A predetermined voltage is applied to the charge roller 71 by the power source, so that the surface of photosensitive drum 51 is uniformly charged with a rotation thereof. Therefore, it is preferable that the charge roller 71 is in contact with the photosensitive drum 51 with a uniform nip width. The charge roller 71 is thus formed in a shape of crown. An elastic layer of roller 71 is made of EPDM (ethylenepropylene terpolymer) in thickness of about 3 mm. The EPDM has hardness between 60 and 70 according to JIS K 6301. A coating of hydrin rubber of thickness of about 200 μm is provided on the surface of EPDM, and a further Toresin (a nylon resin manufactured by Teikoku Chemical Industries, Co., Ltd.) coating (N-methoxy methyl nylon) of thickness of about 10 μm is given thereon, to maintain the conductivity of charge roller 71, to prevent contamination on the surface of charge roller 71, and/or to prevent bleeding of impurity from inside of the charge roller 71. The surface of photosensitive drum 51 uniformly charged is irradiated with a light emitted from a light source 56 and then reflected by an original document stage 58. The surface of photosensitive drum 51 is subject to the irradiation of light with characters or image pattern on an unrepresented original document placed on the original document stage 58. The potential on the portion irradiated is nullified to form a latent image on the surface of photosensitive drum 51.

A developer 75 is provided on the downstream side of the portion of photosenstive drum 51 irradiated by the reflection light from the light source 56 in the direction of rotation of the photosensitive drum 51. Toner is deposited by the developer 75 on the surface of photosensitive drum 51 on which the latent image has been formed, forming a toner image. Since the developer 75 includes toner charged in the same polarity as the photosensitive drum 51, the toner is deposited on the portion excluding the latent image without potential on the photosensitive drum 51. The transfer member 100 is conveyed by the sheet feed unit 60 to the photosensitive drum 51 with the toner image formed thereon to be made in contact with the photosensitive drum 51. The transfer member 100 is charged by a transfer charger 52 in the opposite polarity to the toner, so that the toner on the photosensitive drum 51 is attracted to the transfer member 100, transferring the toner image onto the transfer member 100. The transfer member 100 after the transfer of toner image is subject to charge elimination by charge eliminating pins 53. In the transfer of toner image onto the transfer member 100, the toner image cannot be fully transferred onto the transfer member 100, and therefore leaves a toner residual image on the photosensitive drum 51. The residual toner remaining on the photosensitive drum 51 is removed by a cleaning unit 80.

A cleaning blade 81 is provided in the cleaning unit 80 to be urged against the photosensitive drum 51 at an edge of free end thereof. A cleaning roller 82 is provided to be urged against the photosensitive drum 51 on the upstream side of the cleaning blade 81 in the direction of rotation of photosensitive drum 51. The cleaning roller 82 scrapes off foreign materials such as the residual toner and paper powders on the surface of photosensitive drum 51 having reached to the cleaning unit 81. The scraped-off foreign materials are kept on the cleaning roller 82. The cleaning roller 82 is required to contact with the photosensitive drum 51 in a uniform nip width, and is thus formed in a shape of crown. An elastic layer of the cleaning roller 82 is consisting of an inner layer of silicone rubber with hardness 34±4 in Asker C scale, and of an outer layer of urethane rubber. The toner which the cleaning roller 82 failed to remove is scratched down onto the cleaning roller 82 by the cleaning blade 81. A scraper 83 scraps off the foreign materials held on the cleaning roller 82 to store them in a toner storage section to be disposed outside the cleaning unit 80 by a transport screw 84.

Meanwhile, the transfer member 100 with the transferred toner image is conveyed by a conveyance belt 54 to the fixing unit 90. A fixing roller 91 is rotatably journaled with a heater of roller heating means therein in the fixing unit 90. A pressing roller 94 is opposed to contact with the fixing roller 91, and thus the pressing roller 94 rotates with rotation of fixing roller 91. The transfer member 100 conveyed to the fixing unit 90 is guided by a sheet guide 95 to between the fixing roller 91 and the pressing roller 94 to be pinched by the rollers 91, 94. Since the fixing roller 91 is heated by the heater 92, the toner transferred onto the transfer member 100 is pressed and fused between the fixing roller 91 and the pressing roller 94 to be fixed on the transfer member 100. The fixing roller 91 and the pressing roller 94 are formed in the shape of inverted crown to prevent wrinkles on the transfer member 100. The fixing roller 91 is consisting of a hollow pipe of mandrel of aluminum in which the heater 92 is inserted, an elastic layer of HTV (high temperature vulcanized) silicone rubber with hardness between 60 and 70 according to JIS K 6301 formed on the pipe in thickness of 200–300 µm, and a coating of fluororesin thereon. The pressing roller 94 is consisting of a mandrel and an elastic layer of LTV (low temperature vulcanized) silicone rubber with hardness between 20 and 50 according to JIS K 6301 formed on the mandrel in thickness of 1–10 µm. Details of the pressing roller will be described later. During the fixation, the toner transferred onto the transfer member 100 could adhere to the fixing roller 91. The re-transferred toner will be cleaned by a cleaning pad 93 contacting with the fixing roller 91 to keep the surface of fixing roller 91 cleaned.

After completion of fixation, the transfer member 100 is discharged outside the copying machine by a discharge roller 55 onto a discharge tray to be stacked thereon.

Next explained are processes of production of the pressing roller 94 out of the rollers of crown or of inverted crown in the above-described copying machine.

Figure 2:
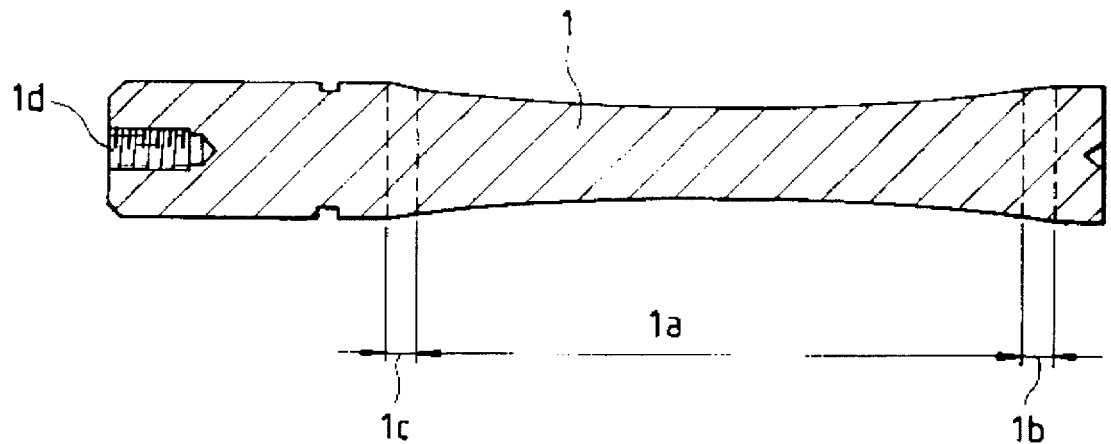
Figure 3:
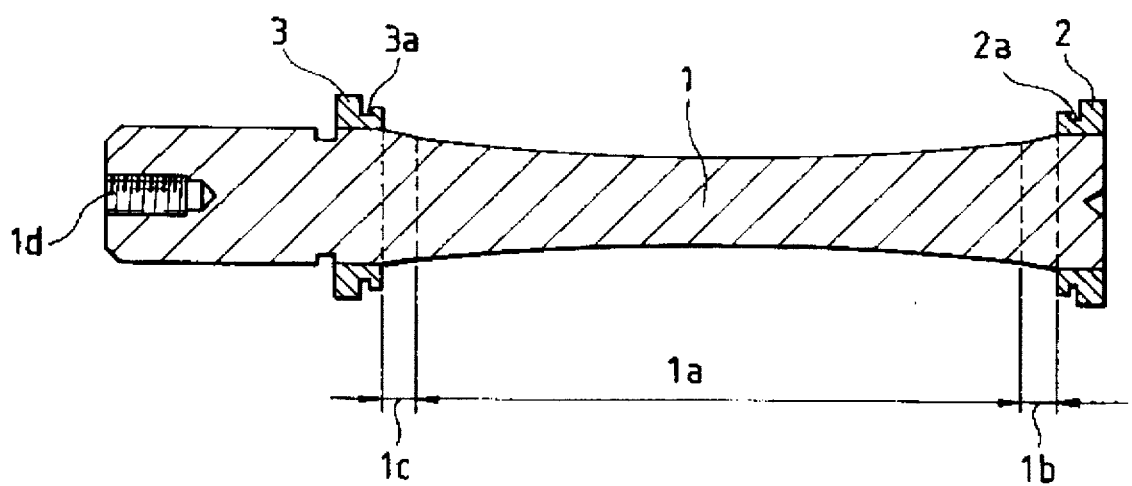

First explained with reference to FIGS. 2 and 3 is a process for producing a matrix shaped in off-right-circular cylinder identical to a periphery of the elastic roller to be produced. FIG. 2 is a sectional view of matrix shaped in off-right-circular cylinder produced by an embodiment of production method of elastic roller of off-right-circular cylinder according to the present invention and FIG. 3 is a sectional view of the matrix of FIG. 2 with reinformcements on a periphery of matrix on the both ends of the off-right-circular cylinder portion.

As shown in FIG. 2, a roller portion 1a of rod matrix 1 made of free-cutting steel of BsBM as specified in H3422 (1966) of Japanese Industrial Standard (JIS) material is shaped in off-right-circular cylinder identical to the periphery of the elastic roller or pressing roller 94 to be produced. In other words, the roller portion 1a of this embodiment is formed of inverted crown, in which a contour gradually increases from the center to the both edge. Taper portions 1b, 1c smoothly continue the roller portion 1a on the respective ends thereof. A thread hole 1d is formed on an end surface of matrix 1 on the left side in FIG. 2. The matrix 1 is shaped as shown by cutting and polishing. Especially, the surface of roller portion 1a is subject to mirror finish to have a surface roughness represented by a maximum height, $R_{max}$ of not more than 0.8 µm.

As shown in FIG. 3, annular reinforcements 2, 3 are fit to the respective tapered portions 1c, 1b on the periphery of matrix 1, and adhered thereto by an adhesive. The reinforcements 2, 3 are made of steel stock subject to hardening to increase the strength. Grooves 2a, 3a are provided on the peripheries of respective reinforcements 2, 3 inside the outermost edges of respective reinforcements 2, 3.

Figure 4:
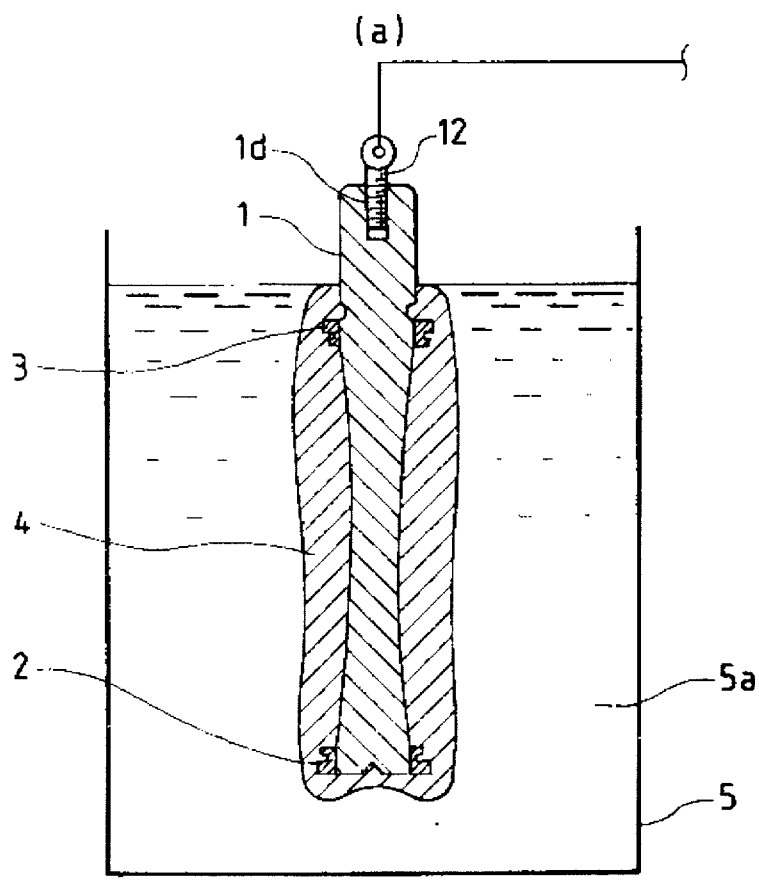

Next explained with reference to FIG. 4 is a process for deposition of material for the mold over the surface of the off-right-circular cylinder portion of matrix 1 and the surface of reinforcements 2, 3. FIG. 4 is a drawing to show the deposition of mold material over the surface of off-right-circular cylinder portion of matrix and the reinforcements as shown in FIG. 3.

As shown in FIG. 4, a mounting screw 12 is set into the threaded hole 1d of matrix 1, and the matrix is dipped in an electrolytic solution 5a filling an electrodeposition tank 5 by suspending the matrix 1 while holding the mounting screw 12. The electrolytic solution 5a is nickel sulfamate bath, in which nickel sulfamate is 300–450 g/l, nickel chloride is 0–30 g/l, and boric acid is 30–45 g/l. A nickel alloy is deposited on the surface of matrix 1 by electroforming. Process conditions of electroforming are shown in Table 1.

TABLE 1

| pH | Temperature (°C.) | Current density (A/dm$^2$) |
|---|---|---|
| 3.5–4.5 | 40–60 | 2.50–20 |

When the matrix 1 is dipped in the electrolytic solution 5a under the process conditions as listed in Table 1 for about 1 week, the mold 4 is formed by deposition of nickel alloy to cover the surface of the off-right-circular cylinder portion (roller portion 1a) of matrix 1, the tapered portions 1b, 1c, and the reinforcements 2, 3. The deposition of nickel alloy is of about 6 mm on the roller portion 1a. The deposition of nickel alloy will cause no problem over the other surface of matrix 1 as shown in FIG. 4.

The thus-formed mold 4 is taken out of the electrodeposition tank 5, and is shaped into a cylinder identical in diameter to the outermost periphery of reinforcements 2, 3 by cutting to remove the ends outside the reinforcements 2, 3 of mold 4 and by cutting the periphery of mold 4. A through hole 1e for dissolution removal is formed by boring through the matrix 1 along its axis to enhance circulation of corrosive liquid upon dissolution removal as later detailed.

Figure 5:
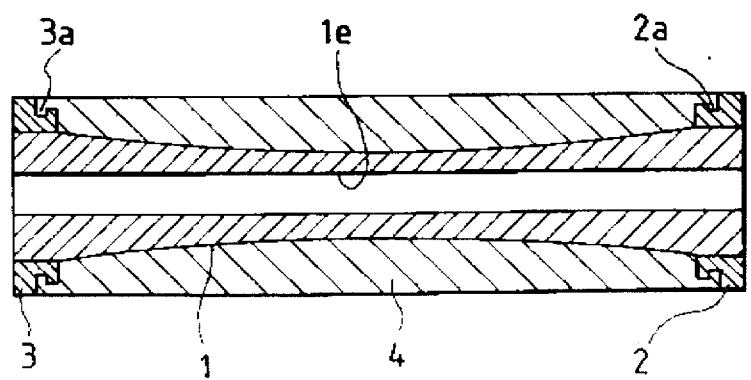
Figure 6:
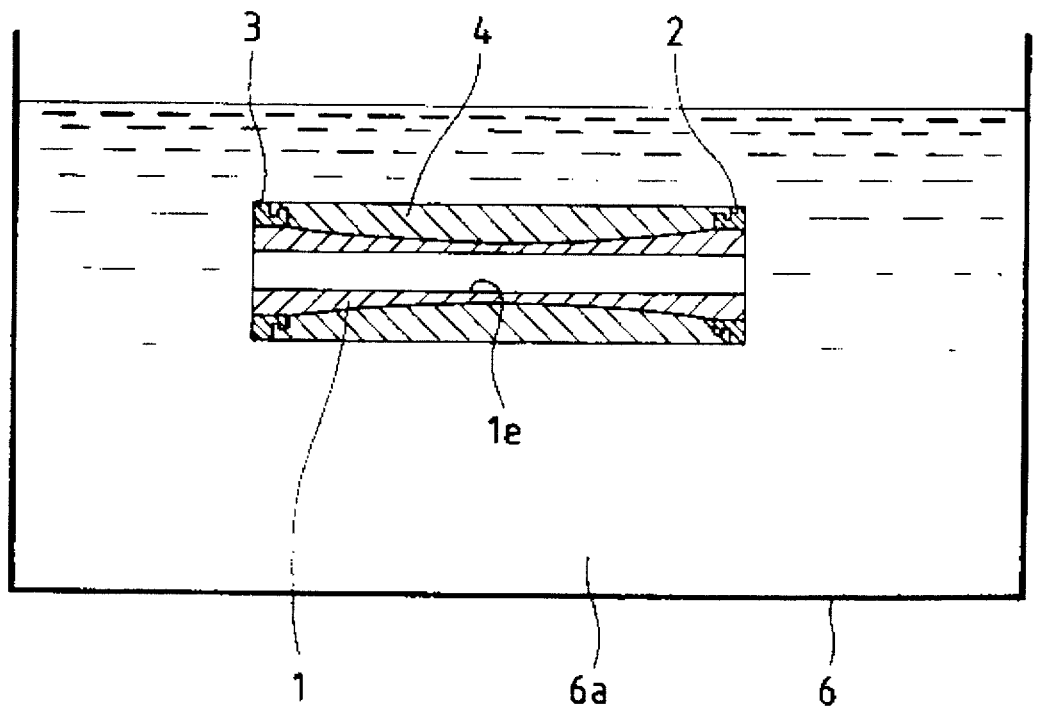

Next explained with reference to FIG. 6 is a process for dissolution removal of matrix 1 from the thus-formed mold 4. FIG. 6 is a drawing to show the dissolution removal of matrix from the mold as shown in FIG. 5, leaving the reinforcements.

As shown in FIG. 6, a solution removal tank 6 is filled with a corrosive liquid 6a which corrodes only the matrix 1. The mold 4 is dipped in the corrosive liquid 6a. The corrosive liquid 6a is an aqueous solution containing a ferric chloride (FeCl$_3$) at a rate of 500 g/l. When the mold 4 is dipped in the corrosive liquid 6a, the corrosive liquid 6a enters the solution removal hollow 1e of matrix 1 so as to dissolve the matrix 1 by corrosion. After the mold 4 is dipped in the corrosive liquid 6a at a room temperature for about two days, the matrix 1 is completely dissolved to remove from the mold 4, leaving a hollow 4a identical in shape to the roller portion 1a and the tapered portions 1b, 1c of matrix 1 in the remaining matrix 4 (see FIG. 7). In other words, the hollow 4a is of inverted crown identical to the periphery of elastic roller (pressing roller 94) to be produced at its center. Roughness of internal surface in the hollow 4a is of mirror, copying surface roughness of roller portion 1a of matrix 1. The reinforcements 2, 3 are fixed in union with the mold 4 on the both sides of hollow 4a, exposing their internal surfaces. Since attachment between the reinforcements 2, 3 and the mold 4 is effected by deposition of nickel alloy over around the grooves 2a, 3a of reinforcements 2, 3, the reinforcements 2, 3 may not readily be separated from the mold 4.

Figure 7:
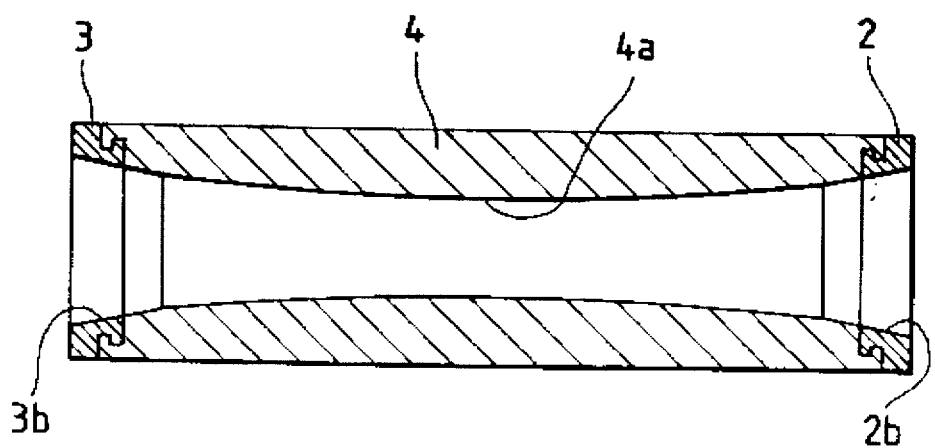

After the dissolution removal of matrix 1 from the mold 4, the mold 4 is washed and the reinforcements 2, 3 are machined by grinding to have internal surfaces as shown in FIG. 7, which are continuously tapered by tapering from the respective internal ends of the hollow 4a. A surface treatment such as hard chrome plating may be optionally applied with necessity on the internal surfaces of tapered reinforcements 2, 3.

Figure 8:
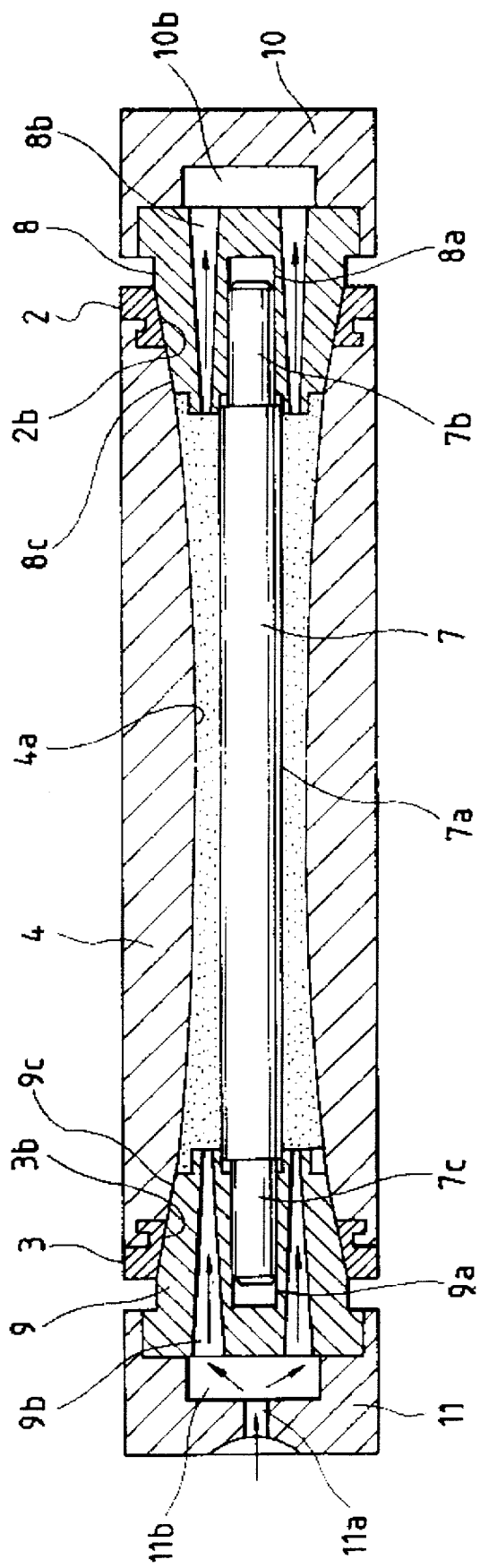
Figure 9:
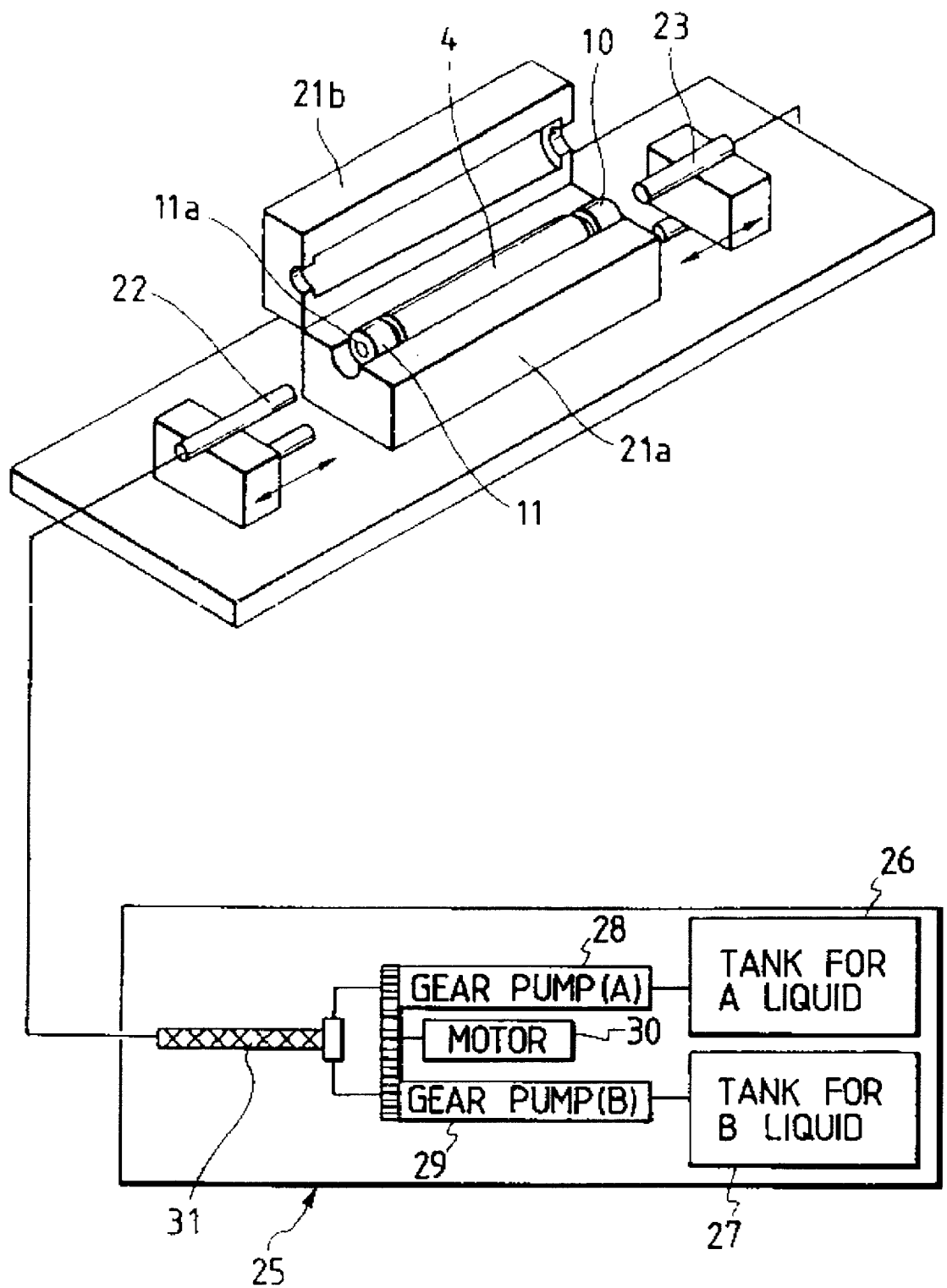

Next explained with reference to FIGS. 8 and 9 is a process for producing the elastic roller using the thus-produced mold. FIG. 8 is a sectional view of the mold as shown in FIG. 7 in assembly with the mandrel, the caps, and the cap covers. FIG. 9 is a schematic drawing of an embodiment of molding apparatus of elastic roller according to the present invention.

As shown in FIG. 8, the two caps 8, 9 are for respectively securing the both ends 7b, 7c of rod mandrel 7. The two caps 8, 9 are given support holes 8a, 8b into which the both ends 7b, 7c of mandrel 7 fit respectively. A plurality of runners 8b, 9b are perforated around the support holes 8a, 8b for passage of elastic material or air upon molding as described later. Insertion portions 8c, 9c at respective ends of caps 8, 9 are tapered to closely fit to tapered portions in the connected internal surfaces of the hollow 4a of mold 4 and the reinforcements 2, 3. The other ends of caps 8, 9 respectively fit into recesses formed on two cap covers 10, 11. The cap cover 11 is provided with an injection opening 11a through which an elastic material is injected and with a room 11b which interconnects between the injection opening 11a and the runners 9b of cap 9. The other cap cover 10 is provided with a room 10b interconnecting between the runners 8 of cap 8 and an unrepresented discharge opening.

An elastic layer is formed on the mandrel 7 in the following steps. An adhesive is coated on the periphery 7a of mandrel 7, and the coated mandrel 7 is brought into the hollow 4a of mold 4. The insertion portions 8c, 9c of caps 8, 9 are inserted to closely fit the ends of hollow 4a of mold 4 and the internal surfaces 2b, 3b of reinforcements 2, 3, respectively, such that the both ends 7b, 7c of mandrel 7 are inserted into the support holes 8a, 9a of caps 8, 9. Then, the both ends 7b, 7c of mandrel 7 are fixed to the both ends of hollow 4a of mold 4 and the reinforcements 2, 3. The axis of mandrel 7 is made coincident with that of hollow 4a of mold 4. The cap covers 10, 11 are fit onto the caps 8, 9, and the assembly is mounted in a molding apparatus as shown in FIG. 9.

As shown in FIG. 9, the molding apparatus comprises lower and upper heating plates 21a, 21b, as holding means for holding to enclose the mold 4, an injector 25, to which an injection nozzle 22 is connected, as injection means for injecting an elastic material into the mold 4, and an evacuation nozzle 23 as evacuating means for evacuating air in the mold 4.

Heating means such as sheathed heater is provided in each of the lower and upper heating plates 21a, 21b, to keep the temperature of mold 4 constant. The injection nozzle 22 connected to the injector 25 is provided movably in the direction of arrow as shown to contact to connect with the injection opening 11a of the cap cover 11 at its end. The injector 25 supplies the elastic material to the injection nozzle 22. The elastic material in this embodiment is the LTV (low temperature vulcanized) silicone rubber of two-part mixing type, which is a low viscosity rubber material. The injector 25 is so constituted as to supply the two liquids to the injection nozzle 22 while measuring and mixing them. The injector 25 has an A liquid tank 26 for storing an A liquid as one raw material of elastic material and a B liquid tank 27 for storing a B liquid as the other raw material of elastic material. The A liquid and the B liquid are accurately measured by an A liquid gear pump 28 and a B liquid gear pump 29 driven by a motor 30, respectively. The A liquid and the B liquid measured by the gear pumps 28, 29 are mixed by a static mixer 31 and then evacuated to be supplied to the injection nozzle 22. Specifically, the elastic material is DY 35-561, a low temperature vulcanized silicone rubber manufactured by Toray-Dow Coning Co., Ltd.

After the mold 4 with the caps 8, 9 and the cap covers 10, 11 attached thereto is set in the above described molding apparatus, the injection nozzle 22 is connected to the injection opening 11a of cap cover 11 and the evacuation nozzle 23 to the evacuation opening of cap cover 10. Then the elastic material is injected under a proper pressure through the injection opening 11a of cap cover 11 by the injection nozzle 22. The injected elastic material passes through the runners 9b of cap 9 to fill a space of hollow 4a between the mold 4 and the mandrel 7. Air occupying the space is evacuated through the runners 8b of cap 8, the room 10b of cap cover 10, and then the evacuation opening of cap cover 10. After the elastic material filled in the spacing between the mold and the mandrel 7 is hardened, the injection nozzle 22 and the evacuation nozzle 23 are released from the respective cap covers 10, 11. The cap cover 10 and the cap 8 are together removed from the mold 4. Similarly, the cap cover 11 and the cap 9 are together removed from the mold 4. Finally taken out from the hollow 4a of mold 4 is the mandrel 7 with the elastic layer of elastic material formed on the periphery 7a thereof. The elastic roller (pressing roller 94) of inverted crown is thus completed.

Table 2 shows molding conditions of elastic layer in the present embodiment.

TABLE 2

| Molding Temperature | 125° C. |
| --- | --- |
| Injection Duration | 38 sec |
| Touch Duration | 5–10 sec |
| Hardening Duration | 8 min |
| Injection Speed | 3.8 g/sec |

In Table 2, the touch duration means a time period in which the injection nozzle 22 and the evacuation nozzle 23 are kept in contact with the cap covers 10, 11, respectively, after completion of injection of elastic material.

The thus-produced elastic roller (pressing roller 94) may be optionally provided with a coating of fluororesin over the elastic layer or with a tube of fluororesin of 20–100 μm thickness, which may be preliminarily set in the hollow 4a of mold 4 before injection of elastic material inside the tube, in order to make it difficult for unfixed toner to adhere thereto.

As explained above, the processing of inverted crown is carried out by easy machining which is the machining of contour of matrix 1 in the present embodiment. Comparing to the difficult conventional machining which is the machining of internal surface of hollow mold, the hollow 4a of desired inverted crown may be readily formed on the mold 4. Since the free-cutting steel easy in cutting and polishing is used for the matrix 1, it is further easy to machine the matrix 1 with a high precision. Also, since the surface roughness of roller portion 1a of matrix 1 is copied onto the internal surface of hollow 4a of mold 4, any surface roughness desired may be formed on the internal surface of hollow 4a of mold 4 by easy processing of finishing the surface of roller portion 1a of matrix 1 with a desired surface roughness, as compared to the conventional processing of finishing the inner surface of hollow of mold. According to the present invention, the periphery of elastic roller may be readily formed with the desired surface roughness.

Further, the adhesion of material for the mold to the matrix 1 is effected by the deposition of nickel alloy by the electroforming, so that the composition of nickel alloy, which is the material for the mold 4, may be readily adjusted as required and that the surface roughness on the surface of matrix 1 may be well copied on the internal surface of hollow 4a of mold 4.

In addition, since the dissolution removal of matrix 1 is conducted by dipping the matrix 1 with deposition of material for the mold in the corrosive liquid 6a, none of matrix 1 remains on the internal surface of hollow 4a of mold 4 without loss in shape of internal surface of hollow 4a, well removing the matrix 1. Also, since the dissolution removal hole 1e is preliminarily perforated in the matrix 1 before the dissolution removal of matrix 1, the duration of dissolution removal of matrix 1 may be shortened because of an increase in contact area between the matrix 1 and the corrosive liquid 6a.

The durability of mold 4 may be improved, because the reinforcements 2, 3 are attached to the mold 4 in integral in the portions where the highest load is applied on the mold 4 upon setting the mandrel 7, that is, in the contact portions with the peripheries of insertion portions 8c, 9c of caps 8, 9.

Although the BsBM material of free-cutting steel is used as the material for the matrix 1 in the above-explained embodiment, other free-cutting steels or materials other than the free-cutting steel may be employed for the matrix 1 without limitation. Also, the material for the mold 4 is not limited to the above explained nickel alloy. The adhesion of material for the mold to the matrix 1 may be effected by other methods than the deposition by electroforming, for example by flame spray coating in which the material for the mold 4 is sprayed over the surface of matrix 1 in a state of or near melt.

In the above embodiment, the matrix 1 is dissolved to remove from the mold 4 in the corrosive liquid 6a. The removal of matrix 1 is not limited to the exemplified method. The dissolution removal may be effected in an electrolytic solution or by using a temperature difference of melting point between the matrix 1 and the mold 4.

Further, the elastic material is injected into the hollow 4a of mold 4 under a proper pressure upon the formation of elastic layer in the above embodiment. The injection is not limited to the above. The elastic material may be introduced into the hollow 4a of mold 4 after evacuation of the hollow 4a in vacuum to suck the elastic material for formation of elastic layer. The mandrel 7 may have a hollow inside or is of pipe.

The above explanation concerns the production process of pressing roller 94 used in the copying machine as shown in FIG. 1. The elastic rollers of inverted crown such as the sheet feed roller 64 and the fixing roller 91 may be also produced in the similar manner. Further, shaping the contour of matrix 1 into crown, the elastic rollers of crown such as the charge roller 71 and the cleaning roller 82 may be produced. The rollers and units using such rollers may be also used in the laser beam printers as well as in the copying machines.

Elastic rollers to be produced by the above-described production process are a platen roller of inverted crown used in a typewriter or in a printer, a platen roller for line sensor of crown which is closely disposed to a line sensor for reading data on an original document in a facsimile, a platen roller for print head of crown which is closely disposed to a print head for data output in a facsimile, and so on. It is possible to produce an elastic roller of off-right-circular cylinder other than of crown or of inverted crown by processing the matrix 1 into a shape of off-right-circular cylinder other than of crown or of inverted crown.

The present invention may enjoy the following advantages as arranged as above explained.

In the elastic roller of off-right-circular cylinder and the production process thereof according to the present invention, the matrix is dissolved to remove from the mold to leave a hollow of off-right-circular cylinder identical in contour to the matrix in the rest mold. Comparing to the conventional difficult processing in which the inner surface of hollow of mold is machined, the hollow of off-right-circular cylinder may be readily formed with a high precision in the mold by easy processing of contour of matrix. Consequently, the thus-produced elastic roller is low in cost because the mold is easily produced, and has an elastic layer of stably constant shape formed thereon.

The production process with attachment of reinforcements on the both ends of periphery of off-right-circular cylinder portion of matrix adds a further advantage of improved durability of mold, because the reinforcements are secured in integral with the mold on the both sides of hollow of off-right-circular cylinder of produced mold, in which the caps are respectively attached.

A second embodiment according to the present invention is below explained with reference to FIGS. 10–14.

Figure 10:
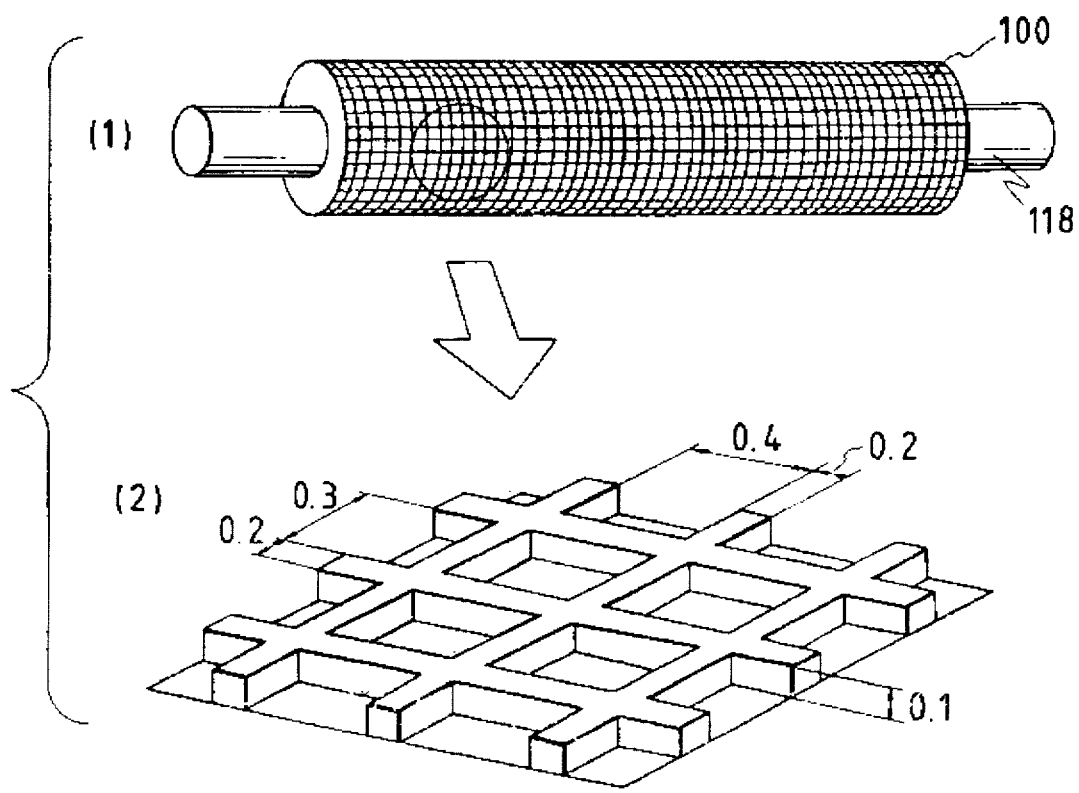

FIG. 10-(1) is a perspective view of thermal fixing roller according to the present invention with geometric unevenness thereon, and FIG. 10-(2) an enlarged schematic drawing of the geometric pattern on the surface.

Figure 11:
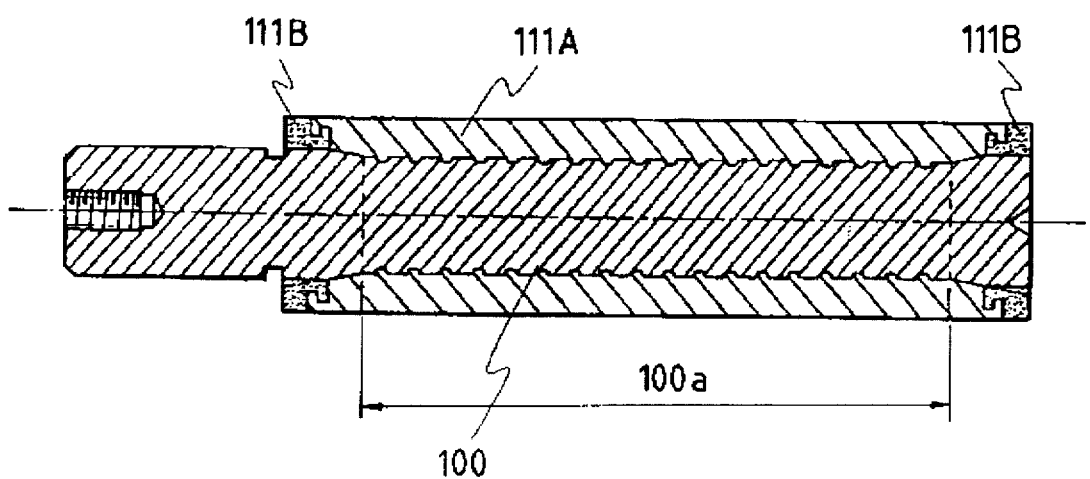

FIG. 11 is a sectional view to show a mold with a matrix before dissolution, just before completion of mold to produce the thermal fixing roller of the present invention. Reference numeral 100a *l denotes a roller portion*.

Figure 12:
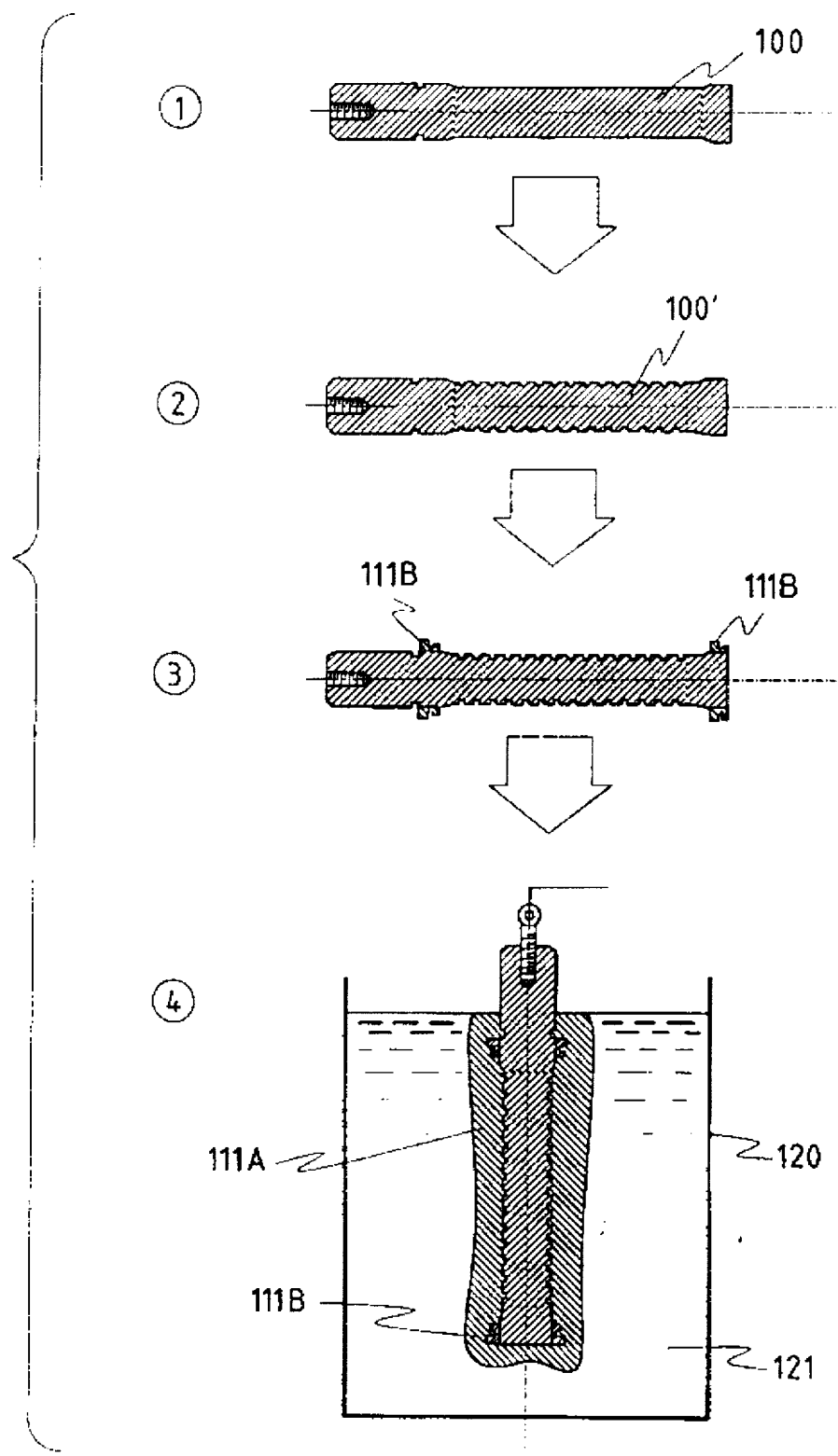
Figure 13:
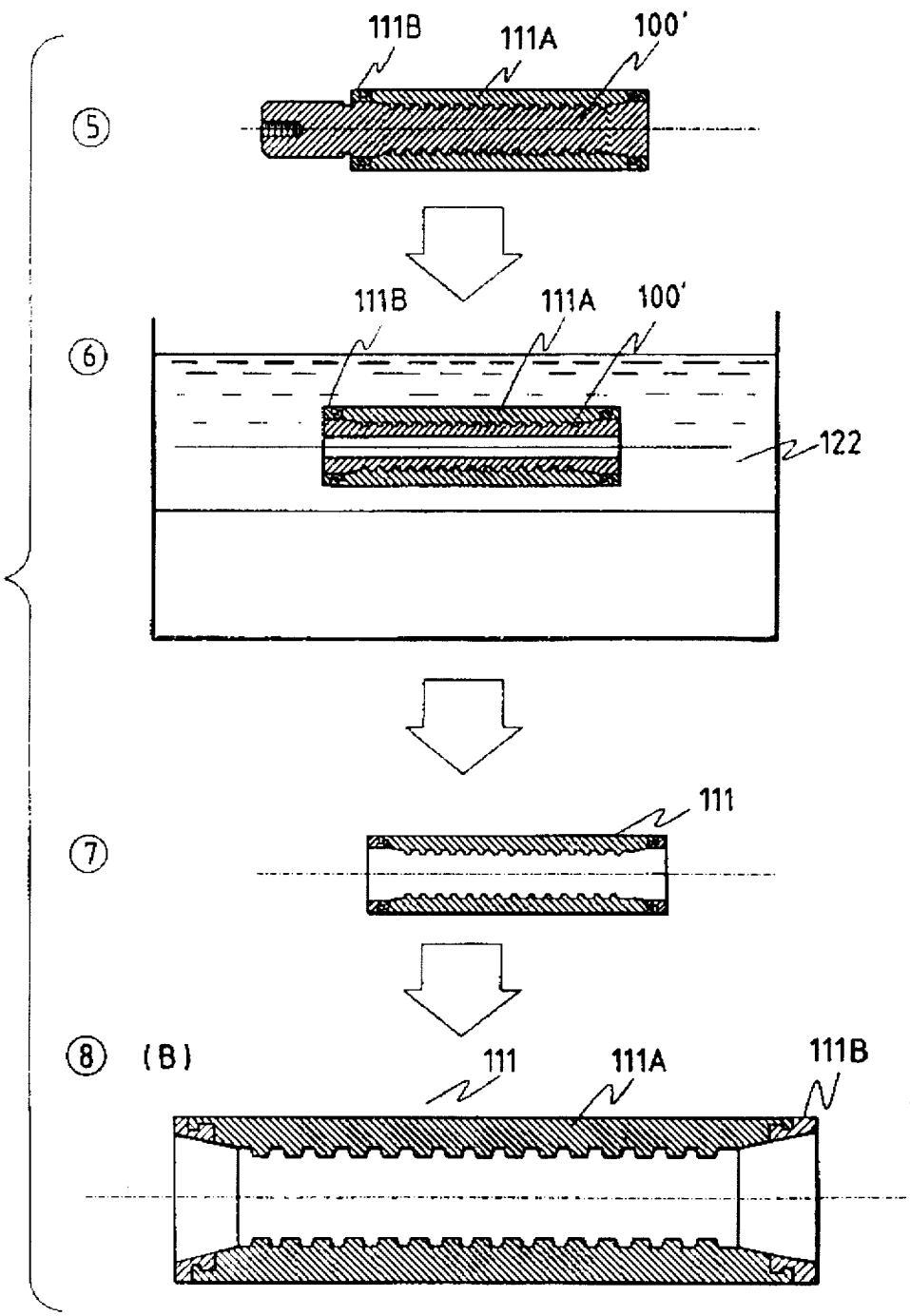

FIGS. 12 and 13 show production processes of mold for molding the thermal fixing roller of the present invention, which is employed in the method of the present invention. FIG. 14 shows molding of thermal fixing roller of the present invention by the mold produced by the production processes.

Referential numeral 100' in ② of FIG. 12 is a matrix shaped in the same contour as the thermal fixing roller desired and etched in a desired surface pattern of unevenness by the photoengraving process. The matrix 100' is of BsBM processed in a high precision, which is easily dissolved for later removal of matrix, and which is ready for copy of the contour of roller and the geometric surface pattern of unevenness on the internal surface of mold.

Numeral 111B in ③ of FIG. 12 is a steel stock for reinforcement of the matrix 100', which is a high hardness material hardened to increase its hardness. The reinforcements 111B are electro-deposited by electroforming as secured to the matrix 100', and are given undercuts to prevent the peeling of electro-deposited portion by the following processing.

Numeral 111A in ④ of FIG. 12 is a material mold electro-deposited around the matrix 100' by electroforming, which is a Ni alloy considering the strength and the corrosion resistance.

Next explained with reference to FIGS. 12–14 is the production process of mold used in the method according to the present invention.

(1) The matrix 100 is produced by cutting and polishing of BsBM material to have the same contour as the thermal fixing roller desired.

(2) A mask is made with a desired pattern, and the pattern of mask is copied on the matrix 100 by etching in the photoengraving process. The matrix 100 is etched with the geometric pattern of unevenness desired on its periphery to provide the matrix 100'.

(3) The reinforcements 111B are made of high hardness material and secured to the both ends of matrix 100' for example with an adhesive.

(4) The integral of the thus-formed matrix 100' and reinforcements 111B is dipped in an electrolytic solution 121 in an electro-deposition tank 120 to obtain deposition of Ni alloy 111A in thickness of about 6 mm on a periphery thereof.

(5) The metal bulk formed around the matrix by the electroforming in (4) is machined in a predetermined shape of mold.

(6) After removing the edges of matrix, a through hole is perforated through the central axis of matrix 100' to enhance circulation of the corrosive liquid 122. The thus-formed matrix 100' is dipped in the corrosive liquid 122.

(7) After completely removing the matrix 100', a remaining portion of mold 111 is washed.

(8) Finally, adjustment is conducted for example for the reinforcement portions. A surface treatment such as metallizing is effected if necessary. Then the mold is obtained with the inverted copy of unevenness pattern as shown in ⑧ of FIG. 13, which is to be further copied on a surface of elastic layer of thermal fixing roller.

Explained in the following with reference to FIG. 14 is a method for producing a thermal fixing roller according to the present invention with geometrix unevenness of high precision on a surface thereof.

(1) After coating an adhesive over a shaft-like mandrel 118, a right end portion 118A (118B) is inserted into a hole of support portion 115B (114B) of cap 115 (114).

(2) The thus-combined mandrel and cap are brought from the right (the left) into a cylindrical hollow 113 of mold 111 with the inverted copy of desired unevenness pattern on its internal surface provided in the processes as shown in FIGS. 12 and 13. A tapered portion of cap 115 (114) is brought into close contact with a tapered opening of cylindrical hollow 113.

(3) Then another cap 114 (115) is fit into a left (right) opening of cylindrical hollow 113. The end 118B (118A) of mandrel 118 is inserted into a hole of support portion 114B (115B) of cap 114 (115). Consequently, the cylindrical hollow 113 becomes a sealed space.

(4) Further, a cap cover 117 is set on the right side of the right cap 115, and a cap cover 116 on the left side of the left cap 114.

(5) A low viscosity material 119, for example LTV (low temperature vulcanized) silicone rubber, is injected through an injection opening 116A provided in the cap cover 116 and through an injection opening 114A of cap 114 into the sealed space of cylindrical hollow 113. The thus-injected LTV silicone rubber flows even into grooves provided on the caps, and then flows out of a discharge opening 115A of cap 115 without leaving air in the portion to become a roller. Before the injection, the LTV silicone rubber is evacuated with agitation before two liquids are sufficiently mixed.

(6) After hardening of rubber material, the caps 115, 114 and the cap covers 116, 117 are together taken out of the both ends of mold 111.

(7) Finally, the roller is drawn in the longitudinal direction of mold 111, obtaining the thermal fixing roller of the present invention with the geometric unevenness of high precision on its surface.

Parentheses in the above steps represent another way of setting of the mold.

The injection of elastic material 119 such as rubber material may be effected by vacuum drawing without pressure.

As explained, the thermal fixing roller of the present embodiment according to the present invention has the surface pattern of unevenness of rectangle, but may have another effective pattern such as circle, polygon for example of hexagon, and wave pattern.

The thermal fixing roller of the present invention as shown in the above embodiment may be broadly applied as an elastic roller, specifically for fixing roller or pressing roller in a fixing apparatus of copying machine, a cleaning roller for photosensitive drum, platen roller, sheet feed roller, and so on.

As explained above, the thermal fixing roller of the present invention has the geometric unevenness of high precision on the surface of elastic layer thereof, so that the thermal fixing roller may perform thermal fixation without wrap of sheet or unsuccessful conveyance of sheet, while supplying the sheets in a stable manner.

Also, according to the method for producing the thermal fixing roller of the present invention, the geometric unevenness provided on the surface of elastic layer can be processed with a high precision by making a mask or by the electric spark machining irrespective of the length or the diameter of roller, so that the thermal fixing roller with a desired geometric unevenness on the surface of elastic layer may be stably repeatedly produced with a high precision in the method of molding and releasing using the mold.

What is claimed is:

1. A method for producing an elastic roller whose external curved surface cylindrical shape is of varying diameter, said method comprising the steps of:

producing a matrix having an external curved surface cylindrical shape of varying diameter;

forming a mold for molding an elastic roller on the external curved surface of said matrix;

removing said matrix from an internal curved surface of said mold to expose a cylindrical curved shape of varying diameter on said internal curved surface;

inserting a mandrel member into said mold, closing both ends of said mold, and injecting a roller material into a cavity formed by said mandrel member and said mold;

allowing the roller material to solidify; and taking out of the matrix the solidified roller material.

2. A method for producing an elastic roller whose external curved surface cylindrical shape is of varying diameter, said method comprising the steps of:

producing a matrix having an external curved surface cylindrical shape of varying diameter;

attaching a reinforcement member to end portions of said matrix;

forming a mold for molding an elastic roller on said external curved surface of said matrix;

removing said matrix from an internal curved surface of said mold to expose a cylindrical curved shape of varying diameter on said internal curved surface, and adjusting a dimension concerning said external curved surface of said mold;

attaching both ends of said mold onto a molding apparatus through said reinforcement member, and injecting a roller material into the internal curved portion of said mold;

allowing the roller material to solidify; and taking out the solidified roller material.

3. A method for producing an elastic roller whose external curved surface is a cylindrical shape of varying diameter, said method comprising the steps of:

producing a matrix having an external curved surface cylindrical shape of varying diameter;

forming a mold for molding an elastic roller on said external curved surface of said matrix;

removing said matrix from an internal curved surface of said mold to expose a cylindrical curved shape of varying diameter on said internal curved surface;

mounting said mold within a molding apparatus, and injecting a roller material into a cavity made by the cylindrical curved surface of varying diameter in the internal curved portion of said mold;

allowing the roller material to solidify; and taking out the solidified roller material.

4. A method for producing an elastic roller for use in an image forming apparatus, said method comprising the steps of;

producing a first mold having an external curved surface of an inverted crown curved shape;

forming a second mold on said external curved surface of said first mold;

removing said first mold from said second mold to expose the inverted crown curved shape on an internal curved surface of said second mold;

mounting said second mold within a molding apparatus, and injecting a roller material into a cavity made by the inverted crown curved shape of said second mold;

allowing the roller material to solidify; and taking out the solidified roller material.

5. A method according to claim 4, further comprising a step of inserting a mandrel member into said second mold when said second mold is mounted within said molding apparatus, and injecting said roller material into a portion between said mandrel member and said inverted crown curved surface of said second mold.

6. A method according to claim 4, further comprising a step of attaching a reinforcement member onto an end portion in an axial direction of said first mold.

7. A method according to claim 5, further comprising a step of attaching a cover member onto both end portions of a cavity formed between the inverted crown curved surface of said second mold and said mandrel member.

* * * * *

UNITED STATES PATENT AND TRADEMARK OFFICE
CERTIFICATE OF CORRECTION

PATENT NO. : 5,538,677
DATED : July 23, 1996
INVENTOR(S) : MASAAKI TAKAHASHI

Page 1 of 2

It is certified that error appears in the above-indentified patent and that said Letters Patent is hereby corrected as shown below:

Item [57] ABSTRACT,
    line 4, "of" should read --of the--;
    line 5, "of" should read --of the--;
    line 9, "of" (1st occurrence) should read --of the--;
    line 17, "remove" should read --remove it--;
    line 18, "of" should read --of the--;
    line 20, "of" should read --of the--; and
    line 21, "of" (1st occurrence) should read --of the--.
Column 1,
    line 41, "is" should read --are--.
Column 2,
    line 48, "to remove" should read --for removal--.
Column 4,
    line 1, "to remove the matrix out of" should read --the matrix for removal from--;
    line 22, "to remove the matrix out of" should read --the matrix for removal from--;
    line 42, "to remove the matrix" should read --the matrix for removal--; and
    line 47, "in integral" should read --integrally--.
Column 7,
    line 54, "scraps" should read --scrapes--.
Column 8,
    line 43, "the both edge." should read --both edges.--, and "Taper" should read --Tapered--; and
    line 67, "matrix" (2nd occurrence) should read --matrix 1--.

UNITED STATES PATENT AND TRADEMARK OFFICE
CERTIFICATE OF CORRECTION

PATENT NO. : 5,538,677
DATED : July 23, 1996
INVENTOR(S) : MASAAKI TAKAHASHI

It is certified that error appears in the above-indentified patent and that said Letters Patent is hereby corrected as shown below:

Column 9,
    line 46, "remove" should read --remove it--.
Column 10,
    line 22, "8" should read --8b--.
Column 12,
    line 12, "in integral" should read --integrally--;
    line 29, "remove" should read --remove it--;
    line 46, "the" (1st occurrence) should read --a--; and
    line 67, "remove" should read --remove it--.
Column 13,
    line 14, "in integral" should read --integrally--; and
    line 26, *"1 denotes a roller portion."* should read --denotes a roller portion.--.
Column 14,
    line 24, "geometrix" should read --geometric--.

Signed and Sealed this

Twenty-first Day of January, 1997

Attest:

BRUCE LEHMAN

*Attesting Officer*    Commissioner of Patents and Trademarks